(12) United States Patent
von Gynz-Rekowski

(10) Patent No.: US 7,882,638 B2
(45) Date of Patent: Feb. 8, 2011

(54) PROCESS FOR MANUFACTURING A BEARING

(75) Inventor: Gunther H H von Gynz-Rekowski, Montgomery, TX (US)

(73) Assignee: Ashmin LC, Conroe, TX (US)

( * ) Notice: Subject to any disclaimer, the term of this patent is extended or adjusted under 35 U.S.C. 154(b) by 1400 days.

(21) Appl. No.: 11/157,730

(22) Filed: Jun. 21, 2005

(65) Prior Publication Data
US 2006/0283017 A1 Dec. 21, 2006

(51) Int. Cl.
*B21D 53/10* (2006.01)
*B23P 13/04* (2006.01)

(52) U.S. Cl. .............................. 29/898.054; 29/898.04; 29/898.047; 29/898.059; 29/898.12; 29/558; 29/402.18; 29/572.2

(58) Field of Classification Search .................. 29/898, 29/898.04, 898.047, 898.054, 898.056, 898.057, 29/898.058, 898.059, 898.12, 898.13, 898.14, 29/402.18, 527.2, 527.6, 458, 459, 557, 558
See application file for complete search history.

(56) References Cited

U.S. PATENT DOCUMENTS

| | | | | |
|---|---|---|---|---|
| 2,164,737 | A * | 7/1939 | Ford | 29/898.054 |
| 3,153,990 | A * | 10/1964 | Kunzog | 92/169.1 |
| 3,409,966 | A * | 11/1968 | Hilbish | 29/898.054 |
| 4,273,159 | A * | 6/1981 | Bolton et al. | 138/109 |
| 6,309,762 | B1 | 10/2001 | Speckert | |
| 6,561,290 | B2 * | 5/2003 | Blair et al. | 175/107 |

OTHER PUBLICATIONS

Bortech Model 306-P, www.bortech.com, web pages downloaded, Bortech Corporation.
Dyna-Drill Technologies Brochure, "New Matrix-3 Coated Bearings boost Performance of Mud Motors".
Elizabeth Carbide Components, Inc. Brochure, "Bushings, Pins, Shafts, and Bearings".
A Pullman Company Brochure, "Conforma Clad".
Arocoy Brochure, "Quick Tip".
UK Intellectual Property Office, Examination Report, Jan. 15, 2010.

\* cited by examiner

*Primary Examiner*—David P Bryant
*Assistant Examiner*—Sarang Afzali
(74) *Attorney, Agent, or Firm*—Jones Walker

(57) ABSTRACT

A process for manufacturing a bearing. The bearing may be used in a tool disposed within a bore hole. The process comprises providing a tubular sleeve and applying a hard facing material on the outer diameter of the tubular sleeve so that the hard facing material is fused onto the outer diameter, and thereafter applying a material layer on the outer diameter so that the material layer is fused onto the outer diameter. The method further includes machining the outer diameter so that a portion of the material layer is removed, and then machining the inner diameter so that only the hard facing material is left as an inner diameter. The method further includes machining the outer diameter and the inner diameter in order to form the bearing. In the most preferred embodiment, the method further includes placing the bearing into a housing, and inserting a mandrel into the bearing, and wherein a hard coating of the mandrel abuts the bearing. A mud motor for rotating a bit in a well bore is also disclosed.

21 Claims, 12 Drawing Sheets

STEP 1
MAKE CORE SLEEVE

STEP 2
APPLY HARDFACING ON OUTSIDE

STEP 7
FINAL MACHINE INNER DIAMETER

MANDREL WITH HARD COATING APPLIED TO OD

PROCESS FOR MANUFACTURING A BEARING

BACKGROUND OF THE INVENTION

This invention relates to a wear surface, hard facing and process. More specifically, but not by way of limitation, this invention relates to a bearing used in surface facilities as well as down hole tools situated in a well bore, and a process for manufacturing the bearing.

In the search for oil and gas, operators find it necessary to drill with a down hole tool that utilizes a down hole motor. As those of ordinary skill in the art will appreciate, the down hole motor includes a stationary housing and a concentrically disposed drive shaft, wherein the drive shaft has attached a bit means for boring a bore hole. The mandrel is rotated while concentrically located within the stationary housing. The friction created by the rotation of the stationary housing relative to the rotating mandrel can cause significant problems including wear, deformation and over-heating. Bearings have been developed for use in these tools. Prior art remedies include use of a coating process about the drive shaft, as well as the inner diameter of the stationary housing. Prior art techniques further include use of carbide inserts as well using standard roller and ball bearing technology.

At least two prior art coating processes are available, namely the adhesion process and the fusion process. Generally, the fusion process is more reliable than the adhesion process because when fusion occurs, the coating material melts into the carrier metal. One inexpensive adhesion process is spray coating, wherein the coating material bonds to the carrier material only due to adhesion force. There are several commercial adhesion process applications available.

As those of ordinary skill in the art will recognize, the fusion process requires significant temperature to melt the surface of materials. Thus, large spray heads and large heating sources are required, and wherein these space limitations make it very impractical for the fusion of inner diameter surfaces such as required for the down hole motors.

As noted earlier, solid carbide and carbide tiles (or splits, or balls) are also available for bearings, and wherein the solid carbide and/or carbide tiles are compressed or glued into the inner diameter of a radial bearing. The solid carbide is very sensitive to shock loading, and the filler matrix of the tiles is very sensitive to temperature, which are both problematic.

Therefore, there is a need for a bearing that can withstand the high temperature and shock loading of down hole applications. There is also a need for an efficient and economical bearing for use with surface equipment and down hole tools. Further, there is a need for a radial bearing used in mud motors. These and many other needs will be met by a reading of the following disclosure.

SUMMARY OF THE INVENTION

A process for manufacturing a bearing is disclosed. The process comprises providing a tubular sleeve having an inner diameter and an outer diameter, and applying a hard facing material on the outer diameter of the tubular sleeve so that the hard facing material is fused onto the outer diameter of the tubular sleeve. The process further includes applying a material layer on the outer diameter of the tubular sleeve so that the material layer is fused onto the outer diameter, and then machining the outer diameter of the tubular sleeve so that a portion of the material layer is removed, and machining the inner diameter of the tubular sleeve so that only the hard facing material is left as an inner diameter.

The process may further comprise cutting the length of the tubular sleeve, and thereafter machining the outer diameter of the tubular sleeve. The process may include grinding the inner diameter of the tubular sleeve in order to form the bearing. In one preferred embodiment, the hard facing material is selected from the group consisting of: tungsten carbide, silicon carbide, or ceramics. Also, the material layer comprises a ductile carbon steel, in one preferred embodiment.

The step of applying the hard facing material may include rapidly cooling the hard facing material, and wherein the step of rapidly cooling may include cooling the hard facing material (post application) from approximately 3500 degrees Fahrenheit to approximately 200 degrees Fahrenheit in roughly two (2) to five (5) minutes. Additionally, the step of rapidly cooling may further include forming micro cracks within the hard facing material.

Also disclosed is a process for manufacturing a radial bearing for use in a down hole mud motor. The process comprises providing a tubular sleeve having an inner diameter and an outer diameter, fusing a hard facing material on the outer diameter of the tubular sleeve so that the hard facing material is applied onto the outer diameter of the tubular sleeve, and fusing a material layer on the outer diameter of the tubular sleeve so that the material layer is applied onto the outer diameter. The process further includes machining the outer diameter of the tubular sleeve so that a portion of the material layer is removed, and machining the inner diameter of the tubular sleeve so that only the hard facing material is left as an inner diameter. The operator could then cut the length of the tubular sleeve, machine the outer diameter of the tubular sleeve, and then machine the inner diameter of the tubular sleeve in order to form the radial bearing. The process further includes placing the radial bearing into a housing, and inserting a mandrel into the radial bearing, and wherein the outer diameter of the mandrel has a hard coating so that the hard coating of the mandrel abuts the radial bearing. In one preferred embodiment, the tubular sleeve is constructed with a carbon steel material, the material layer may be a soft carbon steel, and the hard facing material is selected from the group consisting of: tungsten carbide, silicon carbide, or ceramics. Also, the step of fusing the hard facing is performed using a laser process, in the most preferred embodiment.

Also disclosed is a down hole mud motor for rotating a bit in a well bore. The down hole mud motor comprises a stationary tubular housing and a radial bearing concentrically disposed within the tubular housing. The radial bearing is produced by fusing a first material to an outer surface of a core sleeve, fusing a second material to the outer surface, and machining the core sleeve so that the radial bearing comprises the first material and the second material. The down hole mud motor further comprises an inner mandrel concentrically disposed within the tubular housing, and wherein the inner mandrel has a hard coating applied to an outer diameter of the inner mandrel so that the hard coating and the radial bearing abut. The inner mandrel is capable of rotating the bit. In one preferred embodiment, the housing has an opening for placement of a punch means for punching and removing the radial bearing from the stationary tubular housing.

In yet another embodiment, there is disclosed a process for manufacturing an inner wear surface of a radial bearing for use in a down hole mud motor. The process comprises providing a cylindrical member having an outer diameter and applying a hard facing material on the outer diameter of the cylindrical member so that the hard facing material is fixed onto the outer diameter of the cylindrical member. The process further includes applying a material layer on the outer diameter of the cylindrical member so that the material layer is fixed onto the outer diameter of the cylindrical member and machining the outer diameter of the cylindrical member so that a portion of the material layer is removed. In preferred embodiment, the cylindrical member is a rod and the process further comprises drilling out the rod so that only the hard facing material is left as an inner diameter. The process further includes cutting the length of the rod, machining the outer diameter of the tubular sleeve, and grinding the inner diameter of the tubular sleeve in order to form an inner wear surface of a radial bearing. The process may further include placing the radial bearing into a housing, and inserting a mandrel into the radial bearing, and wherein the mandrel has an outer diameter that has a hard coating so that the hard coating of the mandrel abuts the inner wear surface of the radial bearing.

An advantage of the present invention includes use of an outer diameter fusion process which eliminates the need for separate radial bearing systems and components. Another advantage is that the radial bearing product of the present invention is stronger and more rugged than prior art bearings. Yet another advantage is that the coating of the present invention will endure the severe temperature and shock loads imposed on down hole tools employed in boring holes in subterranean formations.

Another advantage of the present invention is that no radial bearing components are needed other than the housing and mandrel, which are an integral part of a radial bearing. Thus, a more robust mandrel and housing can be used since more radial space is available within the housing. Accordingly, more loading capacity and better reliability are experienced with the radial bearing of the present disclosure.

Yet another advantage is the rapid cooling of the hard facing material in one embodiment which allows for good particle distribution. Also, the rapid cooling process allows, in one preferred embodiment, for the formation of micro cracks in the hard facing material.

A feature of the present invention is that the materials used are applied to the outer diameter of a core sleeve. Another feature is that the outer diameter of the core sleeve, with the materials of the present invention applied thereto, can be machined with conventional tools. Still yet another feature is that the core sleeve, after application of the various materials, can be machined from the inner diameter using known milling and grinding tools. A feature of the present invention is that the starting tubular sleeve may be of sufficient length that it is possible for the operator, after the application of the various layers and machining of the outer and inner diameter, to cut the bearings into several predetermined lengths so that a plurality of bearings are produced, which will result in cost savings and lessen the manufacturing time.

BRIEF DESCRIPTION OF THE PREFERRED EMBODIMENTS

DETAILED DESCRIPTION OF THE PREFERRED EMBODIMENTS

Figure 1:
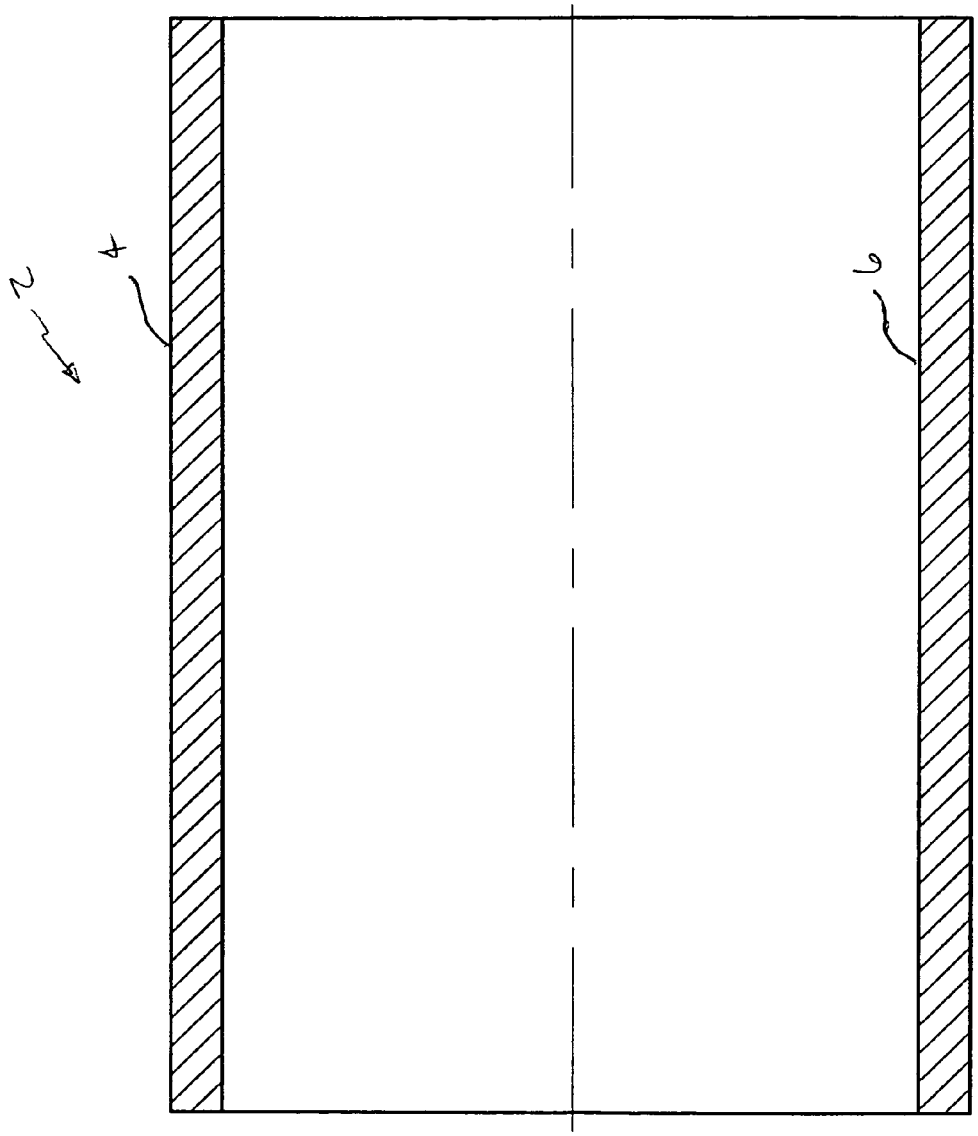
FIG. 1 is a cross-sectional view of a core sleeve of the present invention.

Referring now to FIG. 1, a cross-sectional view of a core sleeve 2 of the present invention is shown. The core sleeve 2 is made up from easy weldable and machinable material such as carbon steel in the preferred embodiment. The core sleeve 2 can also be constructed of a hard plastic. The core sleeve 2 has an outer diameter surface 4 and an inner diameter surface 6. As will be more fully set out, it is important to retain an accurate measurement of the outer diameter surface 4.

Figure 2:
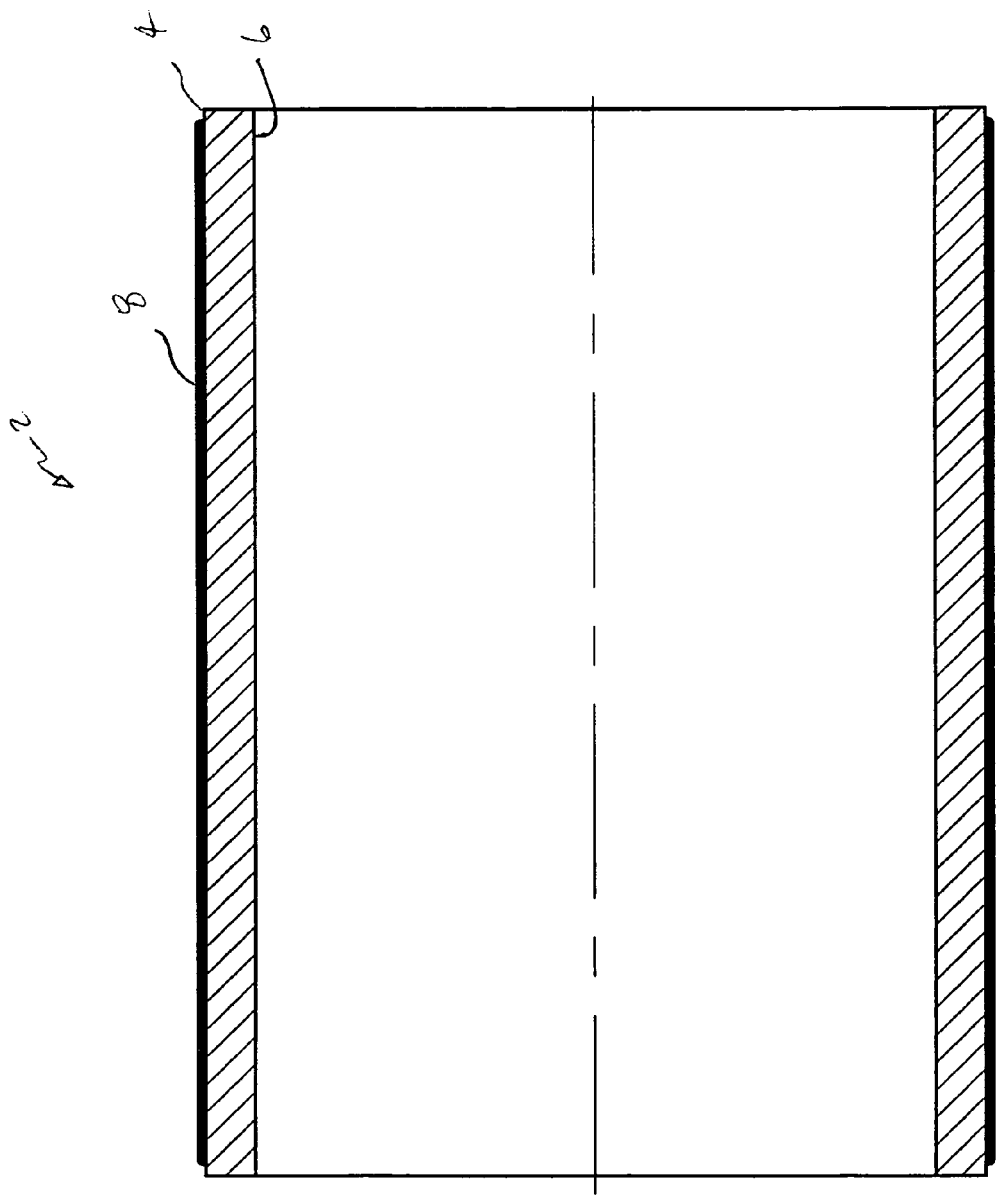
FIG. 2 is a cross-sectional view of the core sleeve of FIG. 1 with a first coating applied thereto.

FIG. 2 is a cross-sectional view of the core sleeve 2 of FIG. 1 with a first coating applied thereto. More specifically, the operator will apply a layer of hard facing to the outer diameter surface 4. In the most preferred embodiment, the fusion process is utilized. An oxygen settling process or a laser process, both of which are commercially available, can be utilized in this hard facing step. In the most preferred embodiment, the laser process is utilized as set out below. Also in the most preferred embodiment, the hard facing material can be selected from the group consisting of tungsten carbide, silicon carbide or ceramics, all of which are commercially available. In the most preferred embodiment, tungsten carbide is used, and is commercially available. Thus, the hard facing material does not have to be heated up above temperatures that would change the mechanical property of the core or carrier sleeves. Also, very hot application temperatures can cause cracks in the structure (of the hard facing material) of the wear particles.

As noted earlier, in the most preferred embodiment, a laser assisted procedure with inert gas coverage is used to apply the hard facing, and the temperature should not exceed 3500 degrees Fahrenheit. It should be noted that it is also possible to use a high velocity oxygen fuel process system (HVOS) in order to apply the hard facing to the outer diameter surface 4. Both the HVOS and the laser assisted procedure is commercially available. The hard facing application in effect generates a new outer diameter surface 8.

Figure 3:
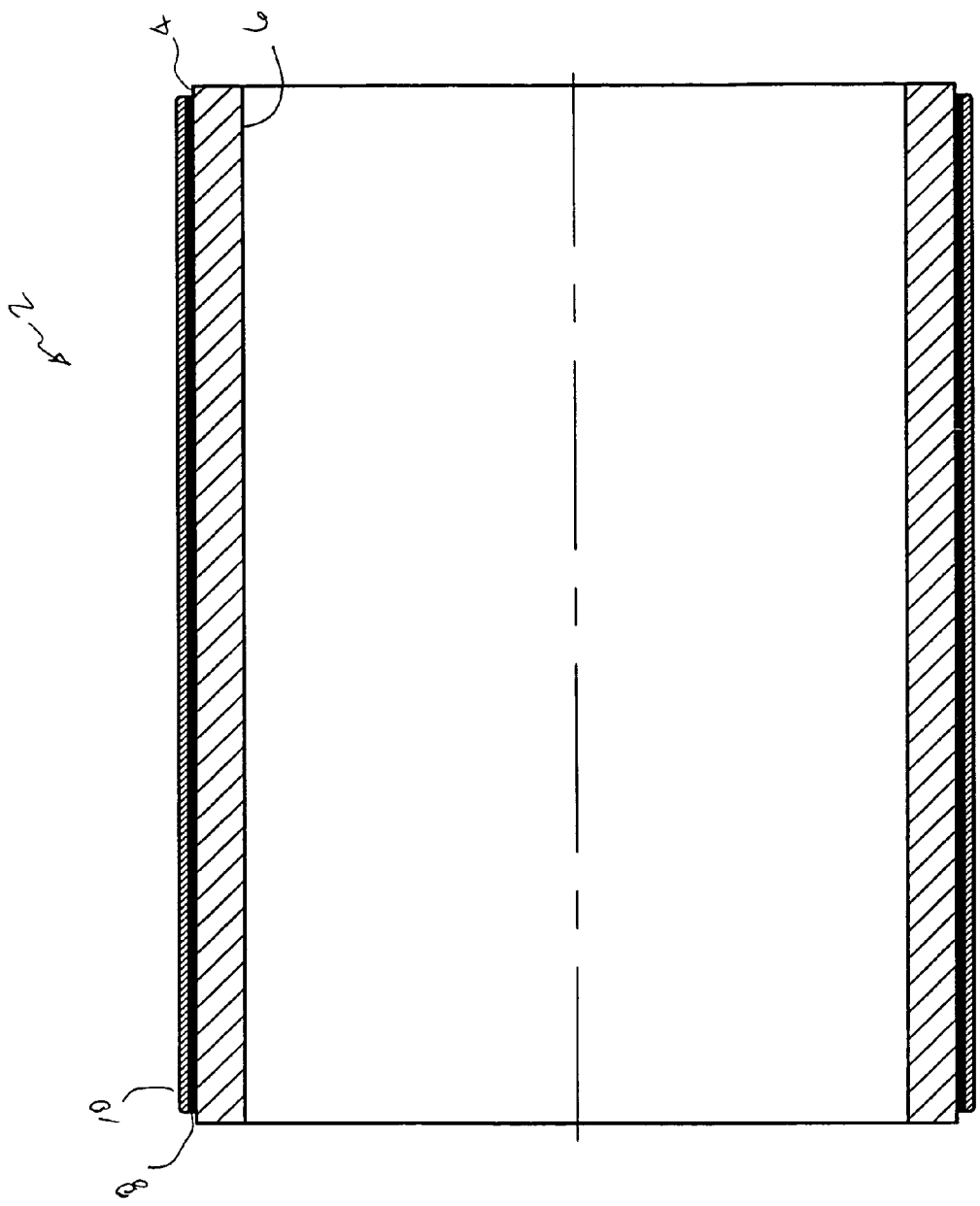
FIG. 3 is a cross-sectional view of the core sleeve of FIG. 2 with a second coating applied thereto.

Referring now to FIG. 3, a cross-sectional view of the core sleeve 2 of FIG. 2 with a second coating applied thereto will now be described. More specifically, the process would include applying a layer of metal (material layer) on the top of the previously applied hard facing surface 8. Thus, a new outer diameter surface 10 is formed. In this step, the operator applies a layer of metal on top of the hard facing. In the most preferred embodiment, the same process that was used for applying the hard facing is used in the step shown in FIG. 3.

Also, the same set up is used, namely a laser assisted procedure with inert gas coverage while not going over temperatures above 3500 degrees Fahrenheit. The metal should have high ductility and medium yield i.e. soft carbon steel. In the most preferred embodiment, the metal used in FIG. 3 is commercially available.

Figure 4:
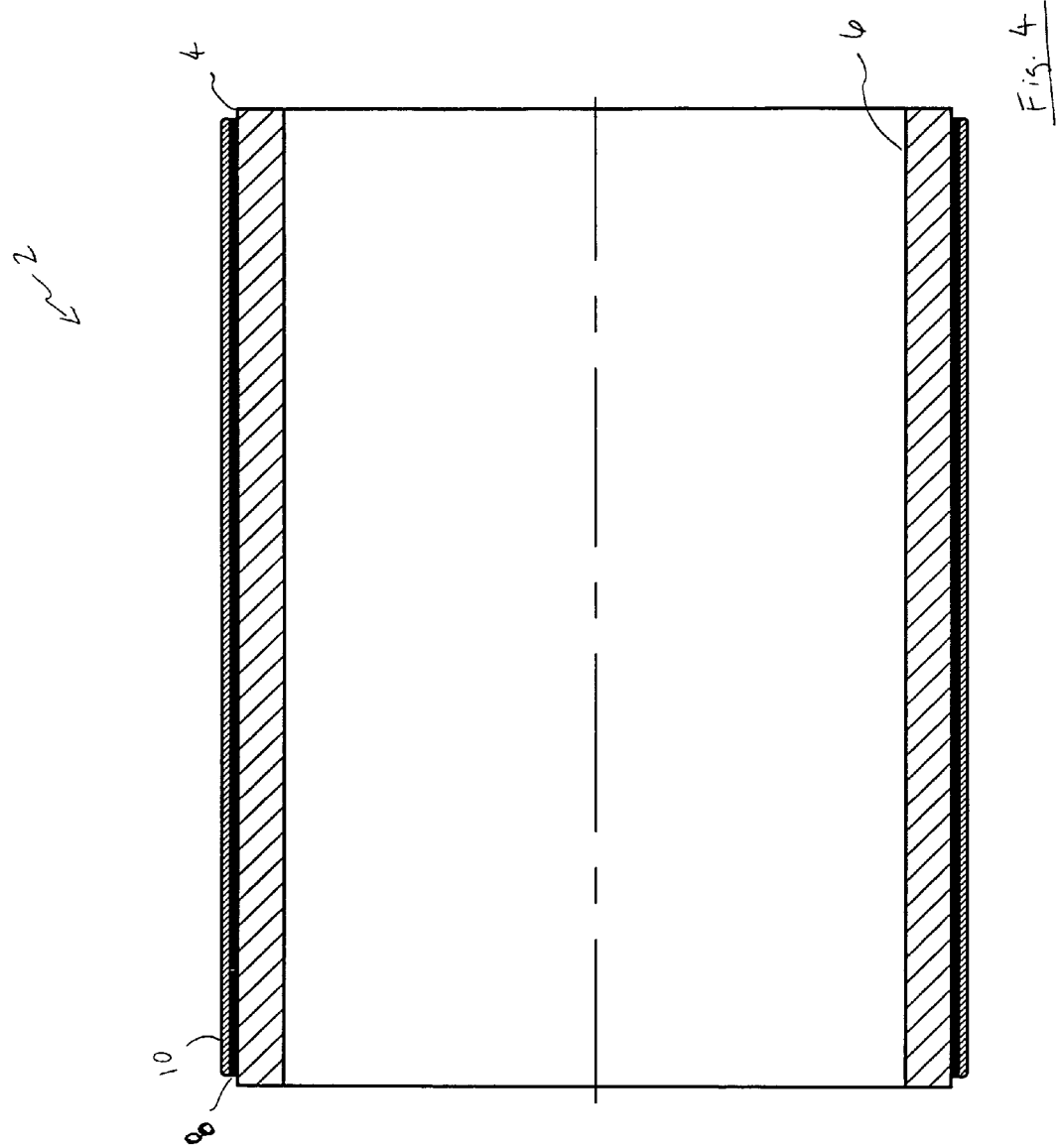
FIG. 4 is a cross-sectional view of the core sleeve of FIG. 3 having been machined on the outer diameter.

FIG. 4 is a cross-sectional view of the core sleeve 2 of FIG. 3 having been machined on the outer diameter 10. In the preferred embodiment, a commercial lathe can be used. It is important to keep as close as possible to a cylindrical shape. Hence, this first cut is referred to as rough since it is important to get a cylindrical shape so that the inner diameter can be measured and machined, as will be discussed in more detail.

Figure 5:
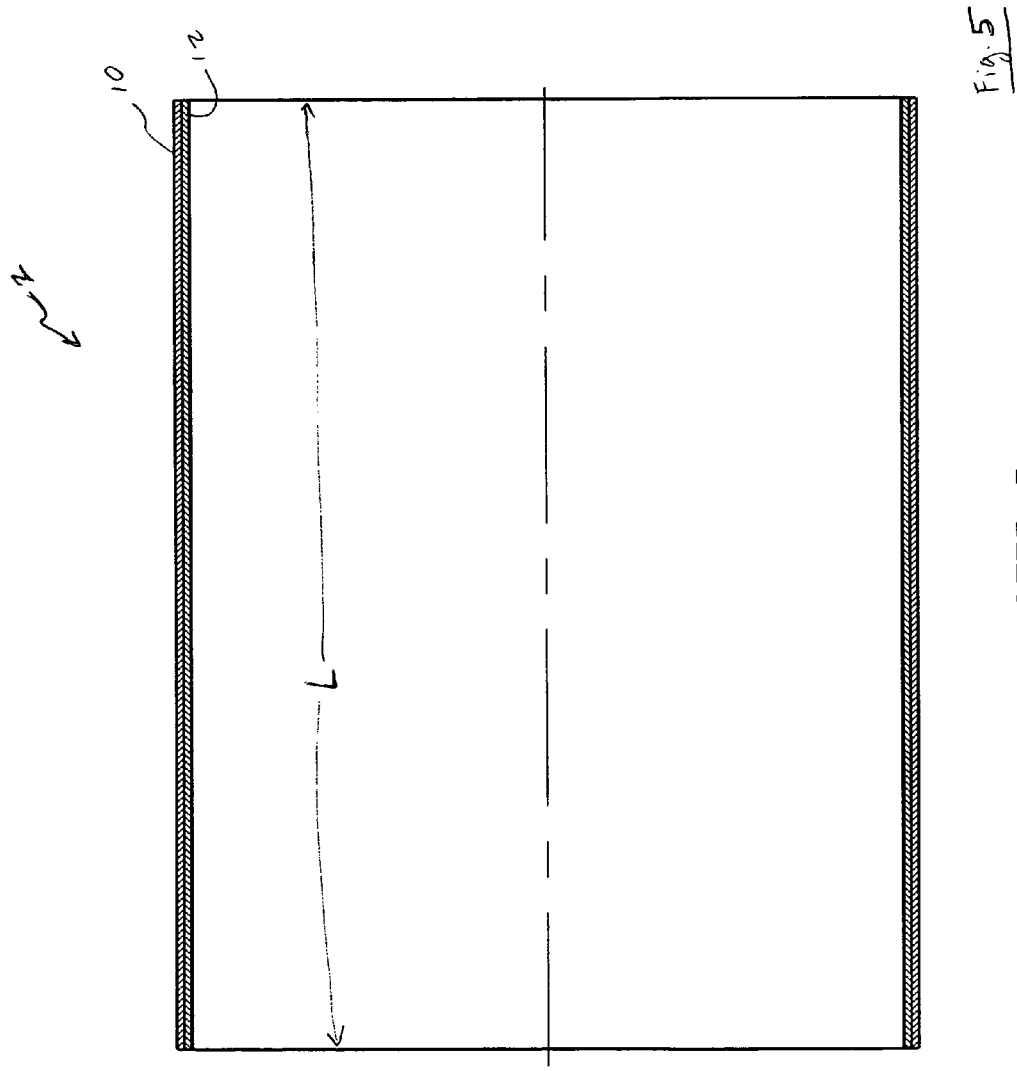
FIG. 5 is a cross-sectional view of the core sleeve of FIG. 4 having been machined on the inner diameter.

Referring now to FIG. 5, a cross-sectional view of the core sleeve 2 of FIG. 4 having been machined on the inner diameter 6 will now be described. A commercially available lathe can also be used. Hence, the operator will utilize known techniques to machine out the inner diameter 6 to a specific dimension, the specific dimension depending on the specific size mud motor used, thereby exposing a new inner diameter surface 12. Additionally, the core sleeve 2 is cut to a specific length L, wherein the length L corresponds to the mud motor dimension as will be more fully set out later in the disclosure. The type of tool used to cut the length may be a commercially available saw. It should be noted that it is within the teachings of this invention that the starting tubular sleeve may be of sufficient length that it is possible for the operator, in this step, to cut several bearings to a predetermined length from this single piece. In other words, the finished bearing of FIG. 5 may be cut into a plurality of bearings so that several bearings are produced, which will save on manufacturing cost and improve time efficiency.

Figure 6:
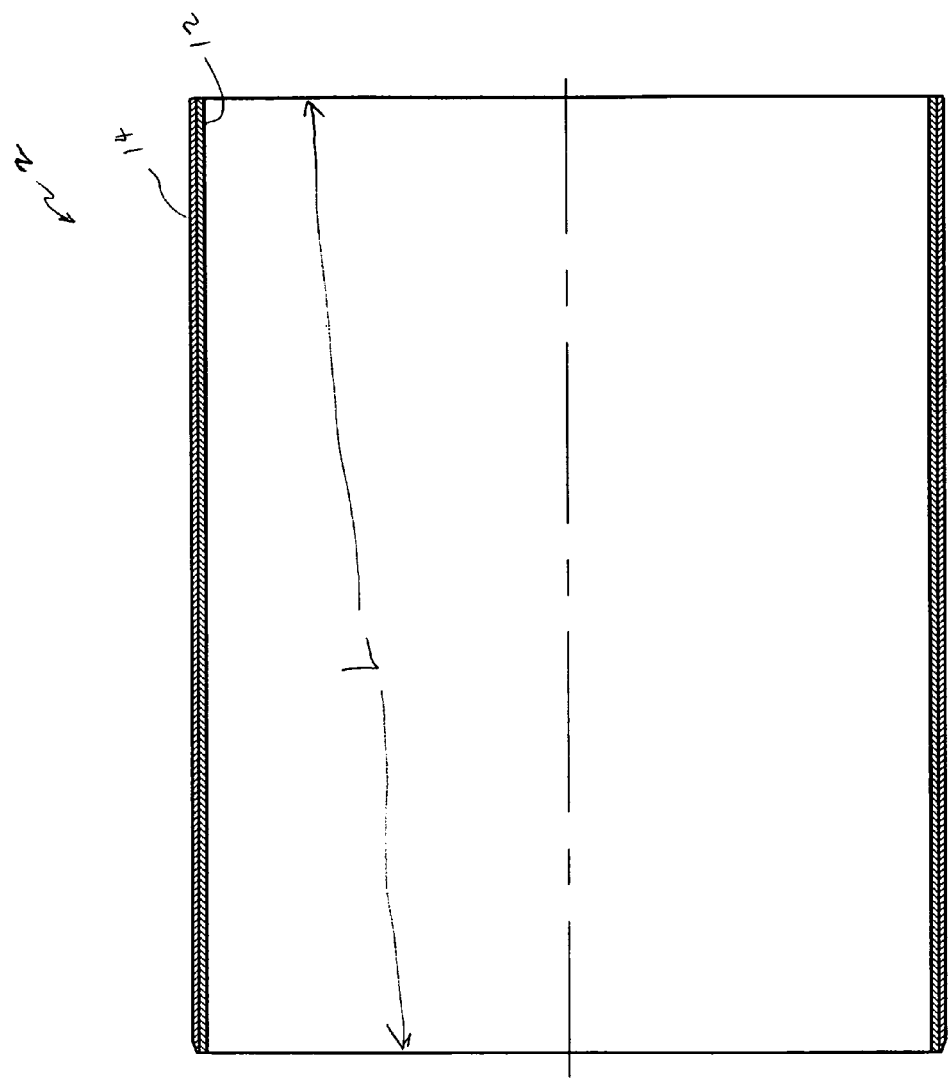
FIG. 6 is a cross-sectional view of the core sleeve of FIG. 5 having been machined on the outer diameter.
Figure 7:
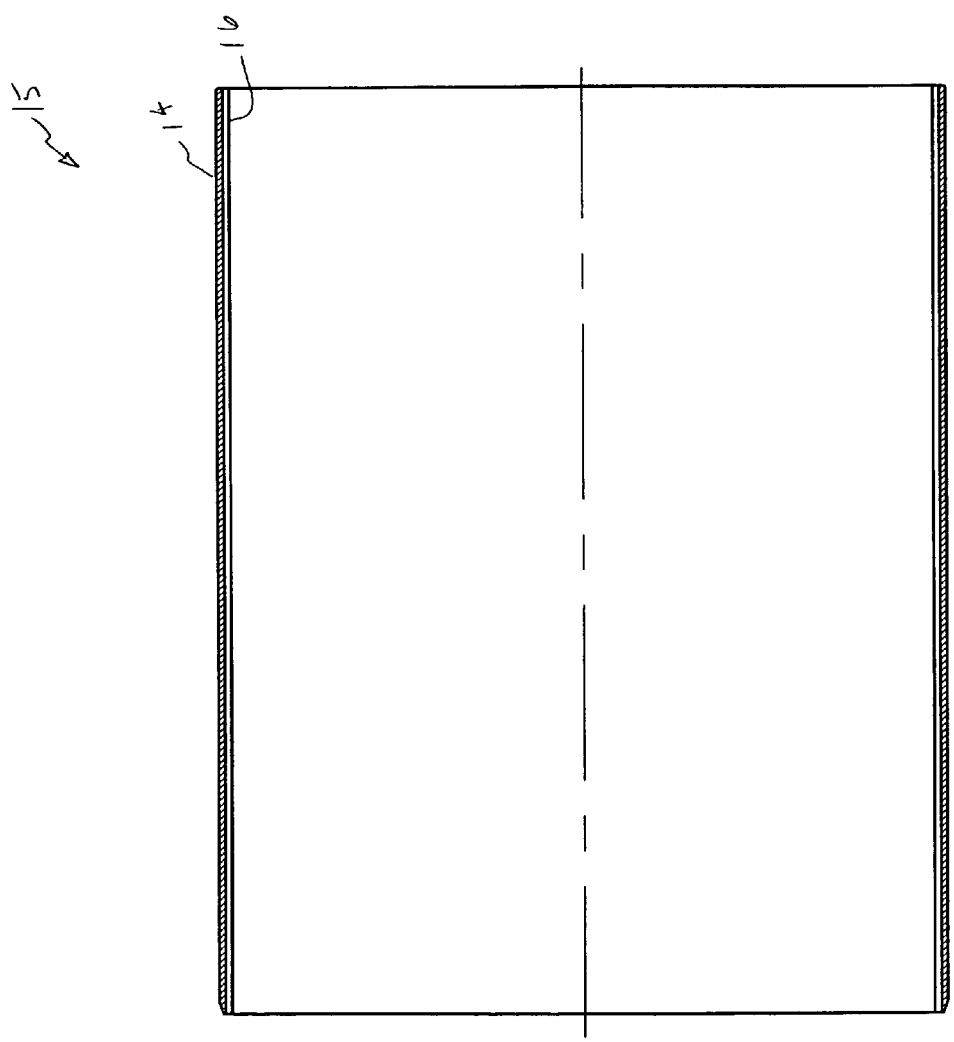
FIG. 7 is a cross-sectional view of the core sleeve of FIG. 6 having been machined on the inner diameter.

In FIG. 6, the cross-sectional view of the core sleeve 2 of FIG. 5 having been machined on the outer diameter surface 10 to the specific dimensions and tolerances of the mud motor is shown. Therefore, FIG. 6 depicts a new outer diameter surface 14 having been exposed through machining. A commercially available lathe may be used in this step. Referring now to FIG. 7, a cross-sectional view of the completed bearing, which is represented by the numeral 15. Hence, bearing 15 is the core sleeve 2 of FIG. 6 having been machined on the inner diameter thereby producing a new inner diameter surface 16. In the most preferred embodiment, this cut is the final machine to the inner diameter area to given specifications and tolerances. The type of tool used to machine the inner diameter, in one preferred embodiment, is a grinding type of tool well known in the art. The steps illustrated in FIGS. 4 through 7 represent the most preferred embodiment of manufacturing the bearing 15 and were done in this specific order, and wherein this specific order has been shown by experimentation to prevent deformation of the bearing 15 due to residual stress generated when machining. Another option to reduce residual stress caused when machining is a controlled beat stress relieve process which entails controlled heating and cooling procedures of the bearing.

Figure 8:
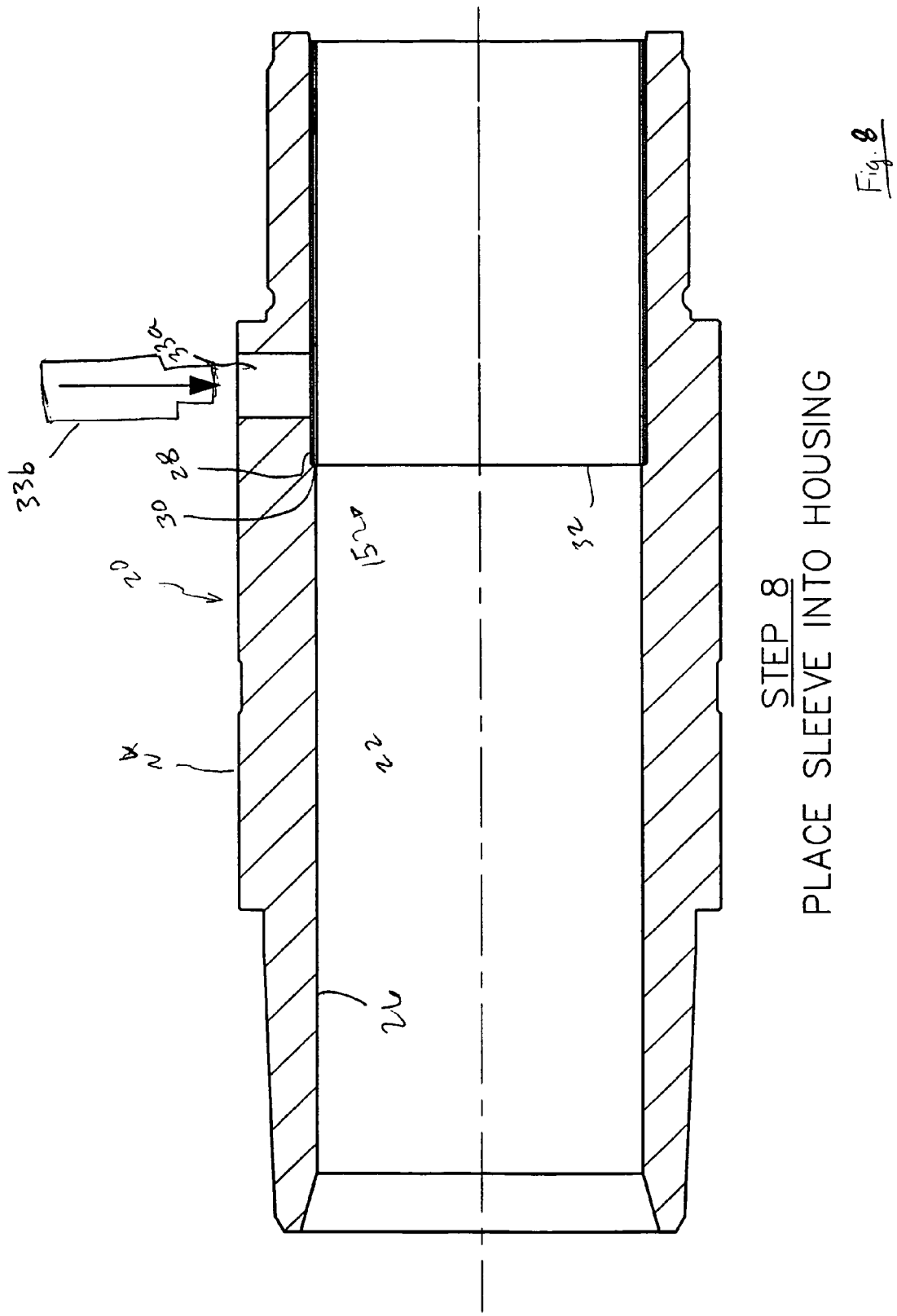
FIG. 8 is a partial cross-sectional view of the core sleeve of FIG. 7 concentrically disposed within a housing of a mud motor.

Referring now to FIG. 8, a partial cross-sectional view of the bearing 15 of FIG. 7 concentrically disposed within a lower housing 20 of a mud motor is illustrated. The bearing 15 is a product made by the process illustrated in steps of FIGS. 1 through 7. The bearing 15 is press fitted in the most preferred embodiment into the inner bore 22 of the lower housing 20. It should be noted that it is also possible to utilize heat shrinking or welding of the bearing 15 into the inner bore portion 22 of the lower housing 20. All these processes are commonly used and known throughout the industry. The combination of the outer radial bearing female 15 placed in the lower housing 20 with the mandrel (that will be described in the discussion of FIG. 9) provides a complete radial bearing assembly means of the present invention.

Returning to FIG. 8, the lower housing 20 contains an outer surface 24, which is generally cylindrical. The inner bore portion 22 contains a first inner diameter portion 26 that extends to a second inner diameter portion 28, and wherein the inner bore portion 22 contains the radial shoulder 30. The end 32 of the bearing 15 will abut the radial shoulder 30. The lower housing 20 has an opening 33a for placement of punch means 33b for punching and removing the bearing. For instance, the operator may find it desirable to remove and replace the bearing, and therefore, the operator can utilize the punch 33b via opening 33a to crimp the radial bearing and remove as appropriate.

Figure 9:
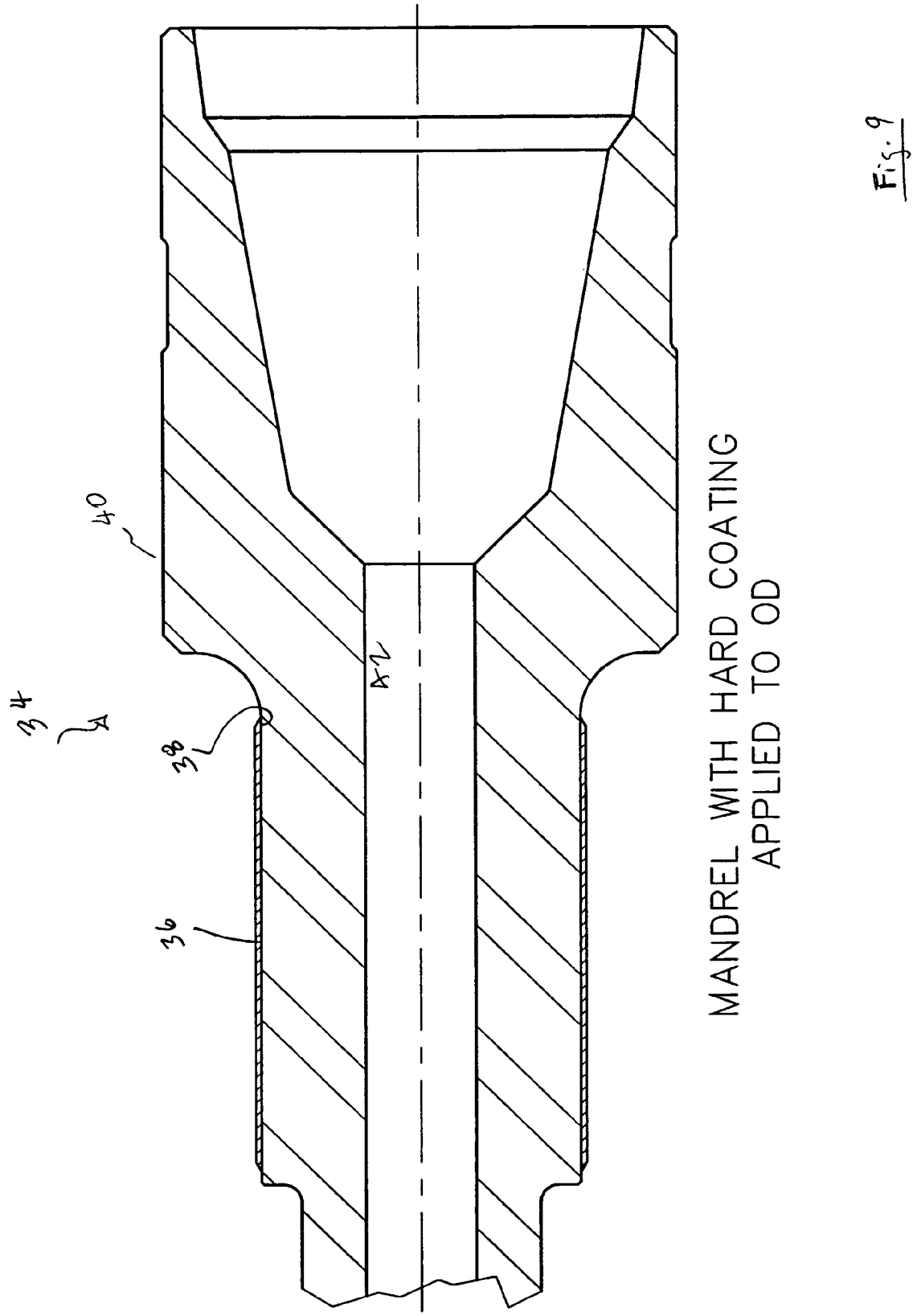
FIG. 9 is a partial cross-sectional view of a mandrel with a hard coating applied to the outer diameter.

FIG. 9 is a partial cross-sectional view of a mandrel 34 with a hard coating 36 applied to the first outer diameter surface 38. The mandrel 34 may also be referred to as the drive shaft 34. The hard coating 36 is applied to the outer diameter surface 38 using known techniques of applying metal material, as was discussed with reference to FIG. 2 above. Returning to FIG. 9, the first outer diameter surface 38 extends to a second outer diameter surface 40, which is an enlarged cylindrical surface. Extending radially inward is the inner bore 42. Generally, the mandrel 34 is the rotational component of the mud motor, and the mandrel 34 can be attached to a bit means, as will be more fully explained later in the application.

Figure 10:
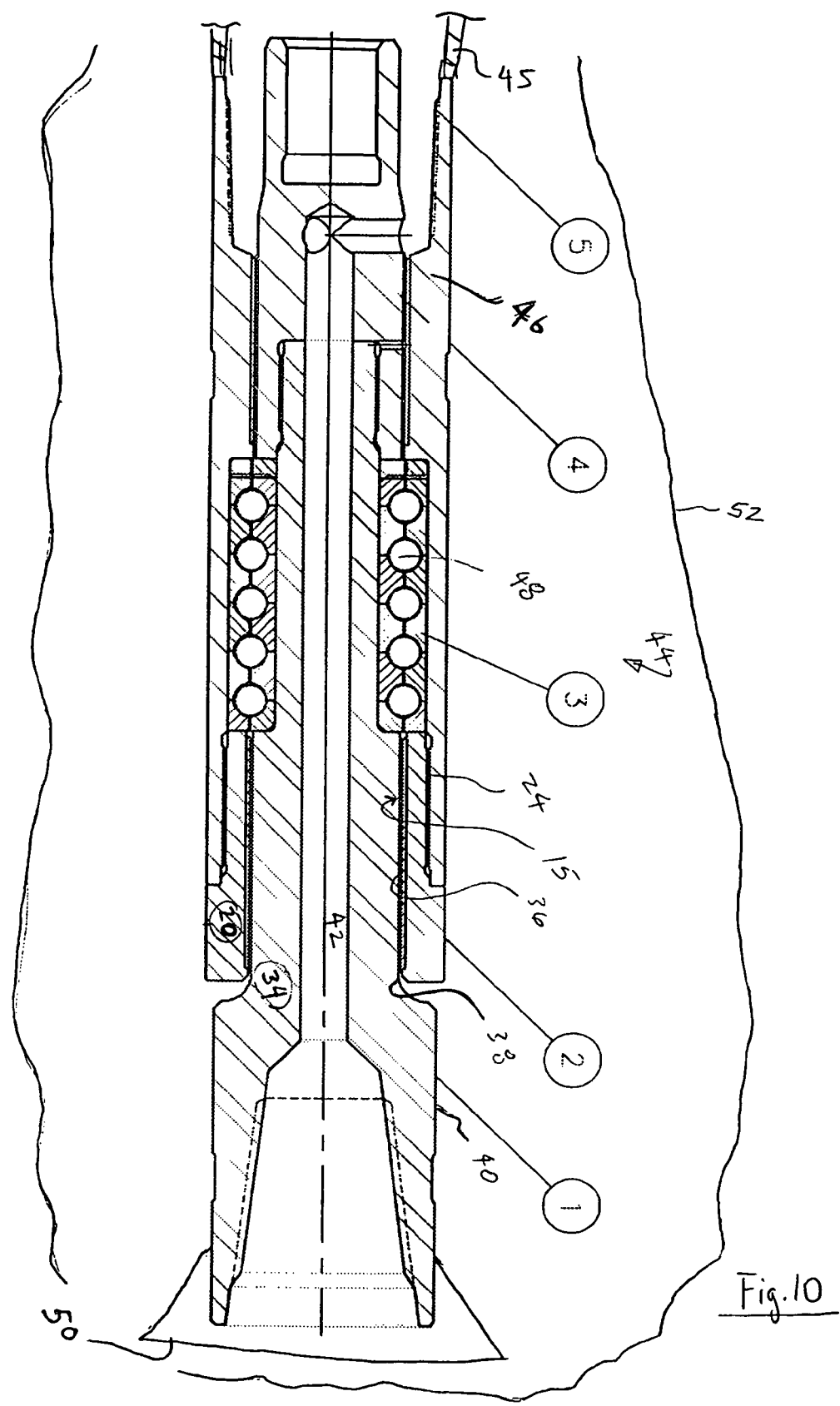
FIG. 10 is a partial cross-sectional view of the mandrel within the housing of a mud motor.

Referring now to FIG. 10, a partial cross-sectional view of the mandrel 34 within the lower housing 20 of a mud motor 44 will now be described. As will be appreciated by those of ordinary skill in the art, mud motors are commercially available from several vendors, and are attached to a drill string 45. For instance, Baker Hughes Inc. has a commercially available mud motor under the name Navi Drill. FIG. 10 depicts the lower housing 20 being connected to an upper housing 46, and wherein the drive shaft 34 (i.e. mandrel 34) is disposed therein. The bearing 15 is shown disposed within the lower housing 20 and wherein the bearing 15 will cooperate with the hard coating 36 of the drive shaft 34. The lower housing 20 and the upper housing 46 is collectively referred to as the housing. With the drive shaft 34 disposed within the housing, a cavity is formed, and wherein the thrust bearing 48 is disposed therein. The purpose of the thrust bearing 48 is to transmit the axial load from the drill string via drive shaft 34 to the bit 50.

As understood by those of ordinary skill in the art, the circulation of drilling fluid down the inner portion of the drill string, and through the mud motor 44, will cause the drive shaft 34 to rotate. The drive shaft 34 will be connected to a bit means 50 for boring a bore hole 52. The purpose of the radial bearing is to allow rotation of the drive shaft 34 relative to the lower housing 20, to clutch radial forces and to allow stabilization of the drive shaft relative to the lower housing 20 while minimizing the friction forces. Operators find it desirable to design the mud motors to rotate at 100 to 300 revolutions per minute. Hence, having a bearing section is critical. The present invention allows for an economical and efficient bearing assembly, with a long life as compared to prior art bearing assemblies.

Figure 11A:
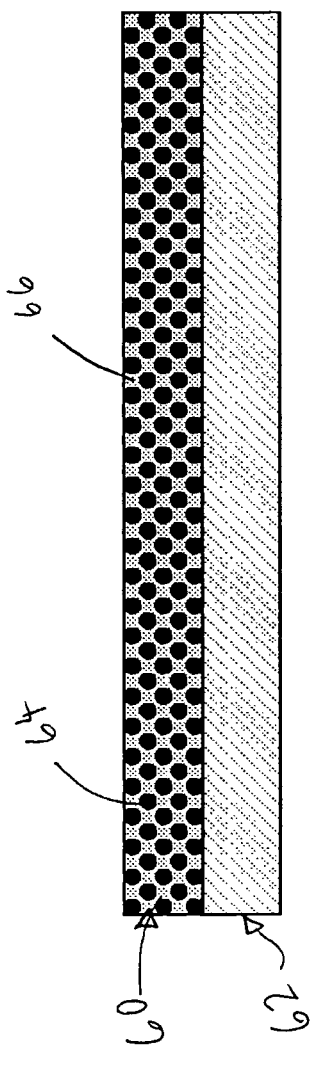
FIG. 11A is a schematic illustration of a preferred embodiment of the hard facing material and the material layer which had undergone a controlled and rapid cooling.

Referring now to FIG. 11A, a partial schematic illustration of a preferred embodiment of the hard facing material 60 and the material layer 62, which have been applied according to the teachings of the present invention, as set out in FIGS. 1 thru 7. Additionally, the hard facing material 60 has undergone rapid cooling after application. More specifically, FIG. 11A depicts the particulate material 64 suspended within the filler material (seen generally at 66). The particulate material 64 may be a carbide and the filler material may be a cobalt or nickel composition, both being commercially available and well known in the art. The hard facing material 60, which may also be referred to as the wear surface 60, is the surface that will abut the mandrel. Therefore, the wear surface 60 bears the rotational and radial force (including friction) of the moving components. The material layer 62 will bear the stress imposed during operation. For instance, in the mud motor application, the material layer 62 will bear the normal stress, shear stress, radial stress, etc.

FIG. 11A depicts a good distribution of the particulate material. As understood by those of ordinary skill in the art, the hard facing material is applied at temperatures in the 3500 degree Fahrenheit range. One of the methods of obtaining good particle distribution is to rapidly cool the hard facing material after controlled application. In other words, the hard facing material is not allowed to cool normally, but rather is rapidly cooled so that the particles are not allowed to settle. This is done by fast cooling which includes cooling the hard facing material from a temperature of 3500 degrees Fahrenheit (immediately after application) to a temperature of 200 degrees Fahrenheit in approximately 2 to 5 minutes.

Figure 11B:
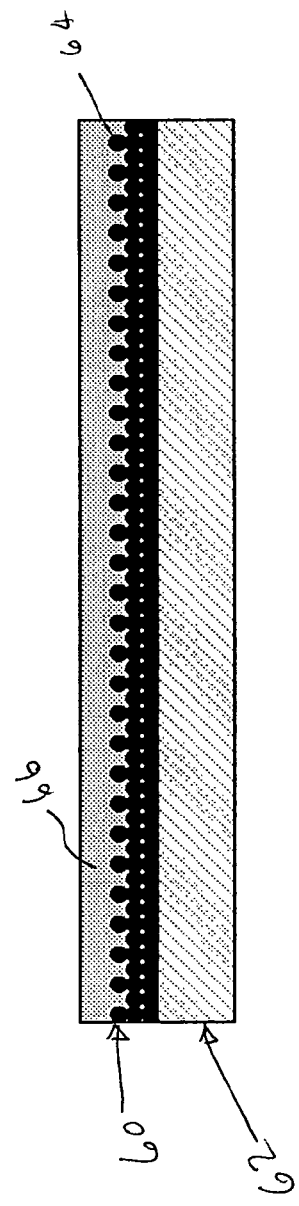
FIG. 11B is a schematic illustration of the one embodiment of the hard facing material and the material layer which had not undergone rapid cooling.
Figure 11C:
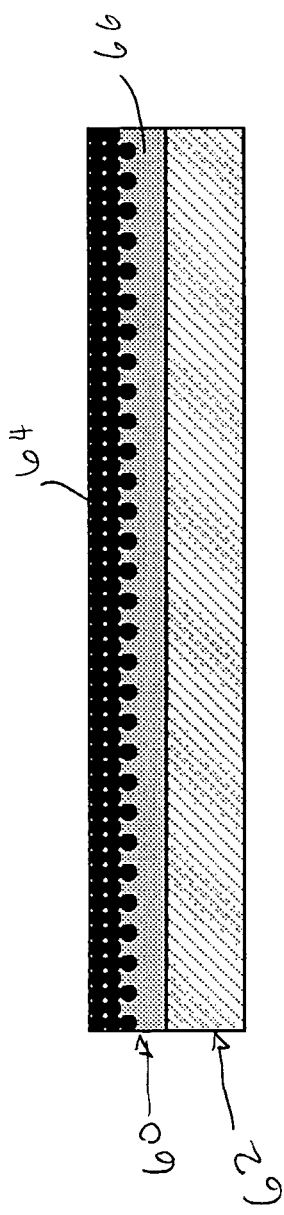
FIG. 11C is a schematic illustration of the one embodiment of the hard facing material and the material layer which had not undergone controlled applying and cooling.

FIG. 11B is a partial schematic illustration of one embodiment of the hard facing material and the material layer, wherein the hard facing material had not undergone rapid cooling. In the embodiment seen in FIG. 11B, the particle distribution is poor. This poor distribution was caused by improper cooling. Referring now to FIG. 11C, a schematic illustration of another embodiment of the hard facing material and the material layer, wherein the hard facing material has not been applied in a controlled manner. In FIG. 11C, the particle distribution is poor. This poor distribution was caused by improper cooling, and an improper mixture of the filler material. Thus, according to the teachings of the present invention, the rapid cooling of the hard facing material 60 will allow for good particle distribution, thereby allow the hard facing material 60 and the material layer 62 to assist its load and wear function of the bearing.

Figure 12:
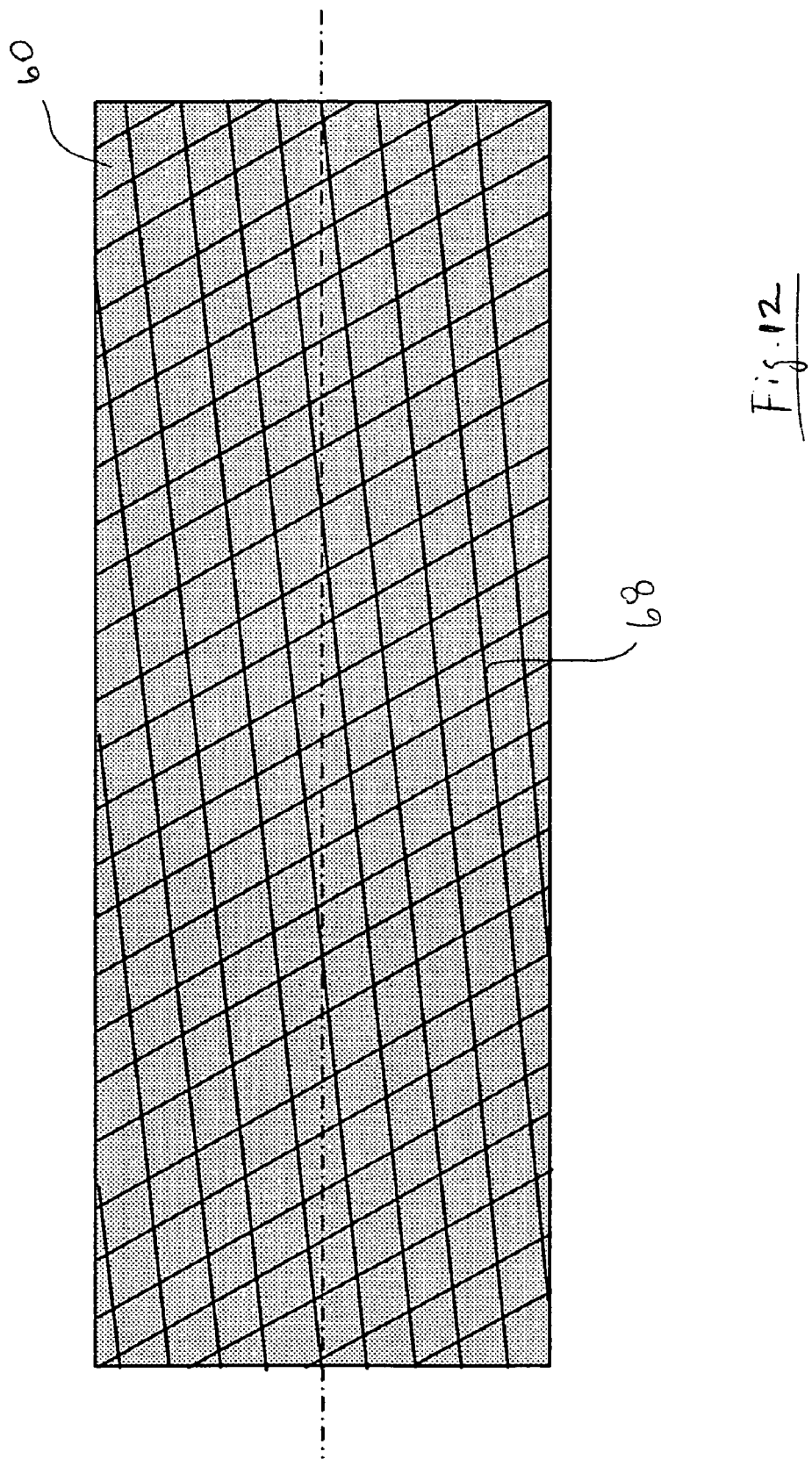
FIG. 12 is a schematic illustration of the micro cracks formed in the hard facing material after rapid cooling.

FIG. 12 is a schematic illustration of the micro cracks formed in the hard facing material after rapid cooling, according to one preferred embodiment. The micro cracks are represented by the diagonal lines traversing FIG. 12. The micro cracks, such as seen at 68, are introduced into the hard facing material 60 by the rapid cooling. The micro cracks makes the hard facing material flexible. At the same time, the hard facing material 60 is not allowed to chip and fall off. Hence, the hard facing material 60 is flexible, but does not fall off.

While preferred embodiments of the present invention have been described, it is to be understood that the embodiments described are illustrative only and that the scope of the invention is to be defined solely by the appended claims when accorded a full range of equivalence, many variations and modifications naturally occurring to those skilled in the art from a review thereof.

I claim:

1. A process for manufacturing an inner wear surface of a radial bearing for use in a down hole mud motor, the process comprising the steps of:
    a) providing a cylindrical member having a first outer surface;
    b) applying a hard facing material on the first outer surface of the cylindrical member so that the hard facing material is fixed onto the first outer surface of the cylindrical member to form a second outer surface of the cylindrical member;
    c) applying a material layer on the second outer surface of the cylindrical member so that the material layer is fixed onto the second outer surface of the cylindrical member to form a third outer surface of the cylindrical member;
    d) controlled cooling the hard facing material from a process temperature of about 3500 degrees Fahrenheit to a temperature of 200 degrees Fahrenheit in a material specific time period in the range of two to five minutes;
    e) machining the third outer surface of the cylindrical member so that a portion of the material layer is removed; and
    f) drilling out the cylindrical member to expose the hard facing material which forms an inner surface of said cylindrical member in order to form an inner wear surface of the radial bearing.

2. The process of claim 1 wherein said cylindrical member is a rod.

3. The process of claim 2 further comprising the steps of:
    g) cutting the length of the rod;
    h) placing the radial bearing into a housing; and
    i) inserting a mandrel into the radial bearing, said mandrel having an outer surface, and wherein said outer surface of the mandrel has a hard coating so that the hard coating of the mandrel abuts the inner wear surface of the radial bearing.

4. A process for manufacturing a wear surface the process comprising the steps of:
    a) providing a structure having a first surface and a second surface, the second surface opposing the first surface;
    b) applying a hard facing material on the first surface of the structure so that the hard facing material is fixed to the first surface of the structure;
    c) applying a material layer over the hard facing material so that the material layer is fixed to the hard facing material;
    d) controlled cooling the hard facing material from a process temperature of about 3500 degrees Fahrenheit to a temperature of 200 degrees Fahrenheit in a material specific time period in the range of two to five minutes;
    e) machining the structure so that a portion of the material layer is removed; and
    f) machining the second surface of the structure to expose the hard facing material in order to form a wear surface.

5. A process for manufacturing a bearing comprising the steps of:
    a) providing a tubular sleeve having a first inner surface and a first outer surface;
    b) applying a hard facing material on the first outer surface of the tubular sleeve so that the hard facing material is fused onto the first outer surface of the tubular sleeve to form a second outer surface of the tubular sleeve;
    c) applying a material layer on the second outer surface of the tubular sleeve so that the material layer is fused onto the second outer surface to form a third outer surface of the tubular sleeve;
    d) controlled cooling the hard facing material from a process temperature of about 3500 degrees Fahrenheit to a temperature of 200 degrees Fahrenheit in a material specific time period in the range of two to five minutes;
    e) machining the third outer surface of the tubular sleeve so that a portion of the material layer is removed; and
    f) machining the first inner surface of the tubular sleeve to form a second inner surface, said second inner surface composed of the hard facing material.

6. The process of claim 5 further comprising the step of:
    g) cutting the length of the tubular sleeve.

7. The process of claim 6 further comprising the step of:
    h) machining the third outer surface of the tubular sleeve.

8. The process of claim 7 further comprising the step of:
   i) grinding the second inner surface of the tubular sleeve in order to form the radial bearing.

9. The process of claim 8 wherein the hard facing material is a tungsten carbide, silicon carbide, or ceramic.

10. The process of claim 9 wherein the material layer comprises a ductile carbon steel, stainless steel, or inconel.

11. The process of claim 6 wherein the controlled cooling of the hard facing material in step (d) includes rapidly cooling the hard facing material.

12. The process of claim 11 wherein the step of rapidly cooling the hard facing material further includes forming micro cracks within the hard facing material.

13. A process for manufacturing a radial bearing for use in a down hole mud motor, the process comprising:
   a) providing a tubular sleeve having a first inner surface and a first outer surface;
   b) fusing a hard facing material on the first outer surface of the tubular sleeve to form a second outer surface of the tubular sleeve;
   c) fusing a material layer on the second outer surface of the tubular sleeve to form a third outer surface of the tubular sleeve;
   d) controlled cooling the hard facing material from a process temperature of about 3500 degrees Fahrenheit to a temperature of 200 degrees Fahrenheit in a material specific time period in the range of two to five minutes;
   e) machining the third outer surface of the tubular sleeve so that a portion of the material layer is removed;
   f) machining the first inner surface of the tubular sleeve to form a second inner surface of the tubular sleeve, said second inner surface composed of the hard facing material;
   g) cutting the length of the tubular sleeve;
   h) machining the third outer surface of the tubular sleeve;
   i) machining the second inner surface of the tubular sleeve in order to form the radial bearing;
   j) placing the radial bearing into a housing; and
   k) inserting a mandrel into the radial bearing, said mandrel having an outer surface, and wherein said outer surface has a hard coating so that the hard coating of the mandrel abuts the radial bearing.

14. The process of claim 13 wherein the tubular sleeve is constructed with a carbon steel, stainless steel, or inconel material.

15. The process of claim 14 wherein the step of fusing the hard facing is performed using a laser process.

16. The process of claim 15 wherein the material layer is a soft carbon steel, stainless steel, or inconel material.

17. The process of claim 16 wherein the hard facing material is a tungsten carbide, silicon carbide, or ceramic.

18. The process of claim 17 wherein the machining of the inner surface in step (i) is performed with a grinder tool.

19. The process of claim 17 wherein in step (g) the tubular sleeve is cut into a plurality of parts so that a plurality of tubular sleeves are formed.

20. The process of claim 14 wherein the step of fusing the hard facing material is performed using an oxygen settling process.

21. The process of claim 13 wherein the tubular sleeve is constructed of a hard plastic.

* * * * *